United States Patent
Evanchik et al.

(10) Patent No.: US 7,844,788 B2
(45) Date of Patent: *Nov. 30, 2010

(54) MIRRORING SYSTEM MEMORY IN NON-VOLATILE RANDOM ACCESS MEMORY (NVRAM) FOR FAST POWER ON/OFF CYCLING

(75) Inventors: Stephen A. Evanchik, Malden, MA (US); Louis M. Weitzman, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 281 days.

This patent is subject to a terminal disclaimer.

(21) Appl. No.: 12/142,895

(22) Filed: Jun. 20, 2008

(65) Prior Publication Data

US 2008/0256316 A1 Oct. 16, 2008

Related U.S. Application Data

(63) Continuation of application No. 11/262,088, filed on Oct. 28, 2005, now Pat. No. 7,457,928.

(51) Int. Cl.
*G06F 12/00* (2006.01)
(52) U.S. Cl. .................. 711/162; 711/103; 707/639; 707/645; 707/659; 707/824
(58) Field of Classification Search ............. 711/126, 711/103; 707/639, 645, 659, 824
See application file for complete search history.

(56) References Cited

U.S. PATENT DOCUMENTS

| | | | |
|---|---|---|---|
| 4,916,605 A | 4/1990 | Beardsley et al. | |
| 5,519,831 A | 5/1996 | Holzhammer | |
| 5,586,291 A | 12/1996 | Lasker et al. | |
| 5,701,516 A | 12/1997 | Cheng et al. | |
| 5,802,561 A | 9/1998 | Fava et al. | |
| 5,809,543 A | 9/1998 | Byers et al. | |
| 6,336,174 B1 | 1/2002 | Li et al. | |
| 6,546,472 B2 | 4/2003 | Atkinson et al. | |
| 6,684,306 B1 | 1/2004 | Nagasawa et al. | |
| 6,694,451 B2 * | 2/2004 | Atkinson | 714/15 |
| 6,882,568 B2 | 4/2005 | Shiota et al. | |
| 6,898,687 B2 | 5/2005 | Wu et al. | |
| 2003/0101228 A1 | 5/2003 | Busser et al. | |
| 2003/0101312 A1 * | 5/2003 | Doan et al. | 710/313 |
| 2003/0126494 A1 | 7/2003 | Strasser et al. | |
| 2003/0233525 A1 | 12/2003 | Reeves | |
| 2005/0086551 A1 | 4/2005 | Wirasinghe et al. | |
| 2005/0117418 A1 | 6/2005 | Jewell et al. | |
| 2005/0138267 A1 | 6/2005 | Bains et al. | |

* cited by examiner

*Primary Examiner*—Stephen C Elmore
(74) *Attorney, Agent, or Firm*—John E. Campbell

(57) ABSTRACT

A computer comprising a processor, a volatile main store, a non-volatile random access memory (NVRAM) mirror store, and optionally a cache for the non-volatile mirror store. While programs of the computer are operational, the contents of the volatile main store are mirrored in the non-volatile mirror store such that when a startup signal is received, the contents of the volatile main store are quickly restored from the contents of the non-volatile mirror store.

15 Claims, 9 Drawing Sheets

Multi-Memory Controller Configuration

Current configuration for turning off/on mobile devices

Turning off device using Non-Volatile RAM (NVRAM)

Turning on device using Non-Volatile RAM (NVRAM)

Multi-Memory Controller Configuration

Turn on device

Turn device off

Write to main memory

MIRRORING SYSTEM MEMORY IN NON-VOLATILE RANDOM ACCESS MEMORY (NVRAM) FOR FAST POWER ON/OFF CYCLING

CROSS-REFERENCE TO RELATED APPLICATION

The present application is a continuation of U.S. patent application Ser. No. 11/262,088 "Mirroring System Memory in Non-Volatile Random Access Memory (NVRAM) for Fast Power On/Off Cycling", now U.S. Pat. No. 7,457,928 filed Oct. 28, 2005 and incorporated herein by reference.

FIELD OF THE INVENTION

The present invention relates to the field of computer systems, and more particularly to memory configurations for powering computer systems on and off quickly.

BACKGROUND OF THE INVENTION

Computer systems such as Personal Computers and Mobile devices often take a significant amount of time to power up in order to make an application program available for a user. To overcome this, some computer systems provide power-save modes to allow computers to enter a hibernation state in order to conserve power rather than to turn completely off. Mobile devices (computers, PDAs and the like) preferably support instant on/off usage while providing long battery life. In order to accomplish this, implementations of these devices may use flash or a hard drive to provide data persistence but typically use standard memory technology for their system memory.

Flash memory backed mobile devices, such as an iPAQ™ from Hewlett Packard Development Company, can easily support
instant on/off usage and long battery life but have a limited amount of persistent data storage. The flash memory is used solely for operating system files. All of the user's data resides in the system memory which must remain powered on in order to preserve its contents from being lost. Consequently, when the iPAQ is turned off electricity continues to power the system memory thus reducing the device's battery life.

Hard drive backed devices, such as the LifeDrive Mobile Manager™ from PALM®, can store large amounts of data and have a moderately long battery life but do not support instant on/off usage. These devices function like a typical laptop or tablet PC with a traditional system memory bank and hard drive. When these devices are powered off, they enter a hibernation state where the contents of the system memory are copied to a file on the hard disk and all of the electronics are turned off including the hard drive. When the device is powered on, the hard drive must spin up to its platter to normal operating RPM and then the file created during the hibernation is loaded in to main memory and the device's use continues. Instant on/off usage is not possible in this scenario because powering up the hard disk is a very slow operation when compared to the user pressing the power button.

Us Patent Application No. 2005/0086551A1: (Wirasinghe et al.) "Memory optimization for a computer system having a hibernation mode" filed Aug. 18, 2003 and incorporated herein by reference, describes computer system that increases performance and reduces power consumption is described. Specifically, the system writes the contents of the system to a non-volatile memory cache before powering down. After repowering the system, the system initiates the load sequence from the memory cache. The Wirasinghe application specifies a non-volatile store to hold the system state, however the non-volatile store is created during the powering off event. Wirasinghe stipulates that state of the system must be stored to a primary non-volatile memory and then to a second non-volatile memory.

A computer system typically comprises a main memory and a secondary memory. Main memory or random access memory (RAM) refers to the physical system that is internal to the computer. The computer manipulates only the data that is in main memory. Therefore, programs that are executed and files that are accessed are typically copied into main memory. When the computer system is powered off, the data in main memory is typically not retained. The amount of main memory in a computer system determines how many programs can be executed at one time and how much data can be readily available to a program.

In contrast to main memory, the data in secondary memory is typically retained even after the system is powered off. Secondary memory allows large amounts of data to be stored. Examples of secondary memory include mass storage devices such as hard disks, floppy disks, optical disks, and tapes.

Computer systems set to a "hibernate" mode typically store the contents of main memory and other devices to secondary memory prior to powering down the system. After the system is powered back up, the computer is restored to the same state as the system was in prior to power down.

An example mobile system of the prior art uses a system depicted in FIG. 3. The operating system reads and writes to main memory and disk in the traditional fashion. When the device is powered off, the contents of main memory and the CPU state ("the snapshot") is stored in a persistent storage device, typically the hard disk. Once the snapshot has been saved to the hard disk, the device can fully power off.

When the mobile device is powered on at a later time, the snapshot of main memory and CPU state must be restored before the device resumes normal operation. Steps necessary in restoring the state of the device include loading the contents of main memory in to memory exactly as it was prior to powering off and then restoring the saved state of the CPU.

There are drawbacks to this configuration. After the command to power off is made, the system consumes approximately the same amount of power as it does during normal operation. This is because the memory controller, disk controller, hard disk and nearly all other components of the mobile device must remain in operation while the contents of main memory and CPU state is stored to the hard disk. Once this task is complete, the system can power off completely. Additionally, the time required to save the contents of main memory to the hard disk is substantial from the perspective of the user. If the user turns the device off and then immediately turns it on, either accidentally or purposefully, the user must wait for the device to complete one save state and restore state cycle.

SUMMARY OF THE INVENTION

A new mobile architecture based on a multistage memory subsystem using traditional system memory, a non-volatile memory technology, a memory controller and a hard drive. During the device's operation, write operations to system memory are mirrored by the memory controller to the non-volatile memory. When the device is turned off, the non-volatile memory contains a verified good and complete copy of the system memory. When the device is powered on, the contents of the non-volatile memory are loaded in to the main memory and device operation continues. Because the non-volatile memory does not need electricity to maintain its charge, no power is consumed when the device is off. Additionally, the significant delay required to read and write the hibernation file is eliminated in this system.

It is therefore an object of the invention to provide a computer implementation to facilitate quick startup/shutdown, the computer comprising a processor, a volatile main store and a non-volatile mirror store wherein while programs of the computer are operational, contents of the volatile main store are mirrored in the non-volatile mirror store and, responsive to a startup signal, the contents of the volatile main store are restored from the contents of the non-volatile mirror store.

It is a further object of the invention to receive a startup signal at the computer and responsive to the startup signal received, to load the contents of the non-volatile mirror store into the volatile main store, when the loading is completed, programs of the computer are made operational, the programs comprising an operating system and zero or more application programs. When the programs of the computer have been made operational, and when storing data from the processor to the volatile main store, the data is also stored to the non-volatile mirror store. In response to receiving a shutdown signal to shutdown the computer the programs of the computer are made non-operational. Power to the computer is turned off when data stored from the processor to volatile main store has been stored to the non-volatile mirror store.

It is yet a further object of the invention to enter a hibernation mode after making the programs of the computer non-operational.

It is yet a further object of the invention to provide the non-volatile main store at least as large as the size of the volatile store.

It is yet a further object of the invention when storing data from the processor to the volatile main store, the storing the data to the non-volatile mirror store first stores the data in a cache memory, then the stored data from the cache memory is read and stored into the non-volatile mirror store.

It is yet a further object of the invention to derive the startup the computer signal a powering on event of the computer.

It is yet a further object of the invention when the programs of the computer have been made operational, the computer fetches the data only from the volatile main store and not from the non-volatile store.

It is yet a further object of the invention to page the data to the non-volatile mirror store when paging data from an external store to volatile main store.

It is yet a further object of the invention perform the loading the contents of the non-volatile mirror store into the volatile main store by any one of the processor or a memory manager associated with the processor.

It is yet a further object of the invention wherein the computer further comprises a memory cache to, responsive to receiving the shutdown signal, to store in the non-volatile mirror store, lines of the memory cache having the data to be stored in the non-volatile mirror store but not yet stored in the non-volatile mirror store.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DESCRIPTION OF PREFERRED EMBODIMENTS

Figure 1:
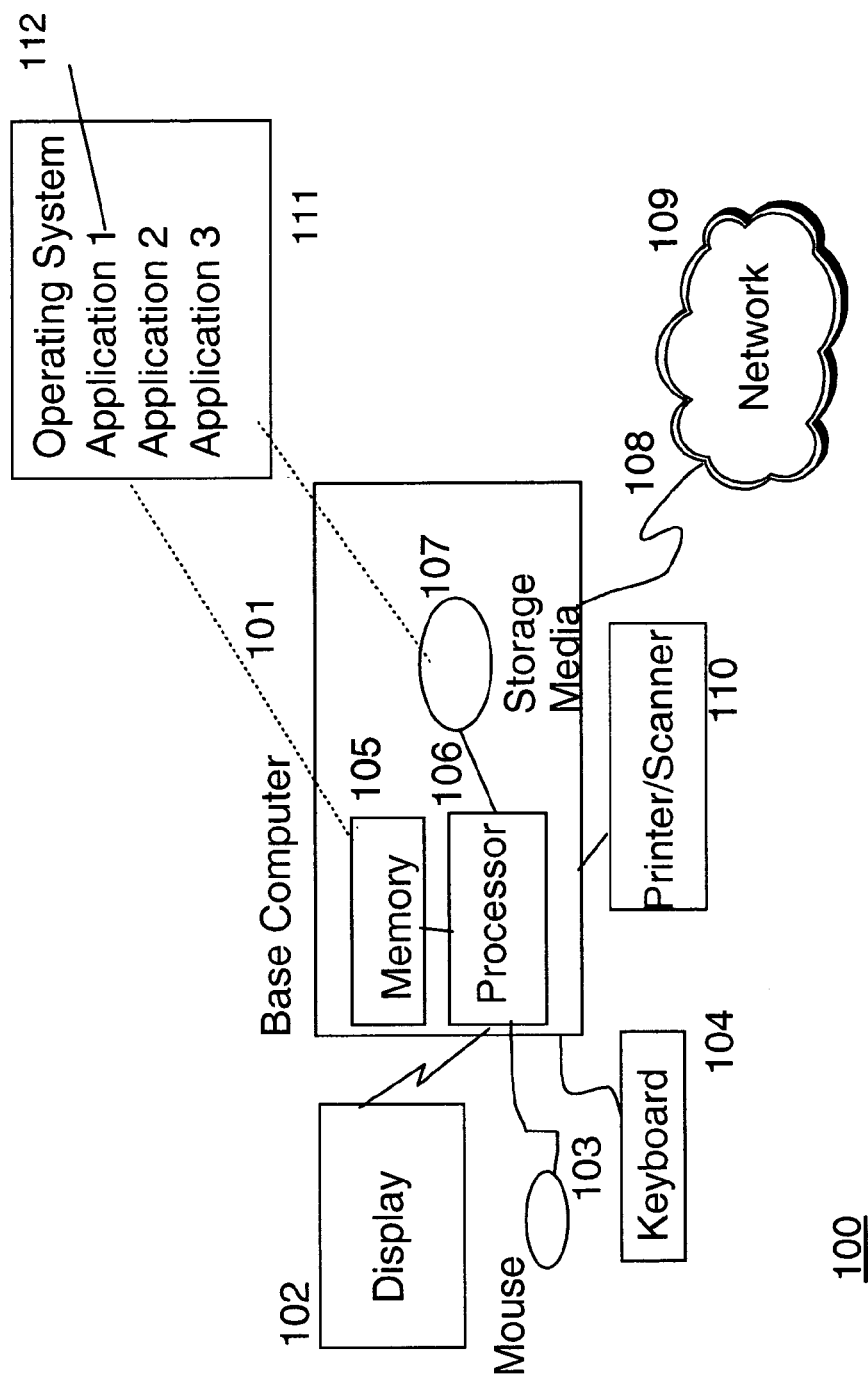
FIG. 1 is a diagram depicting components of a prior art computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
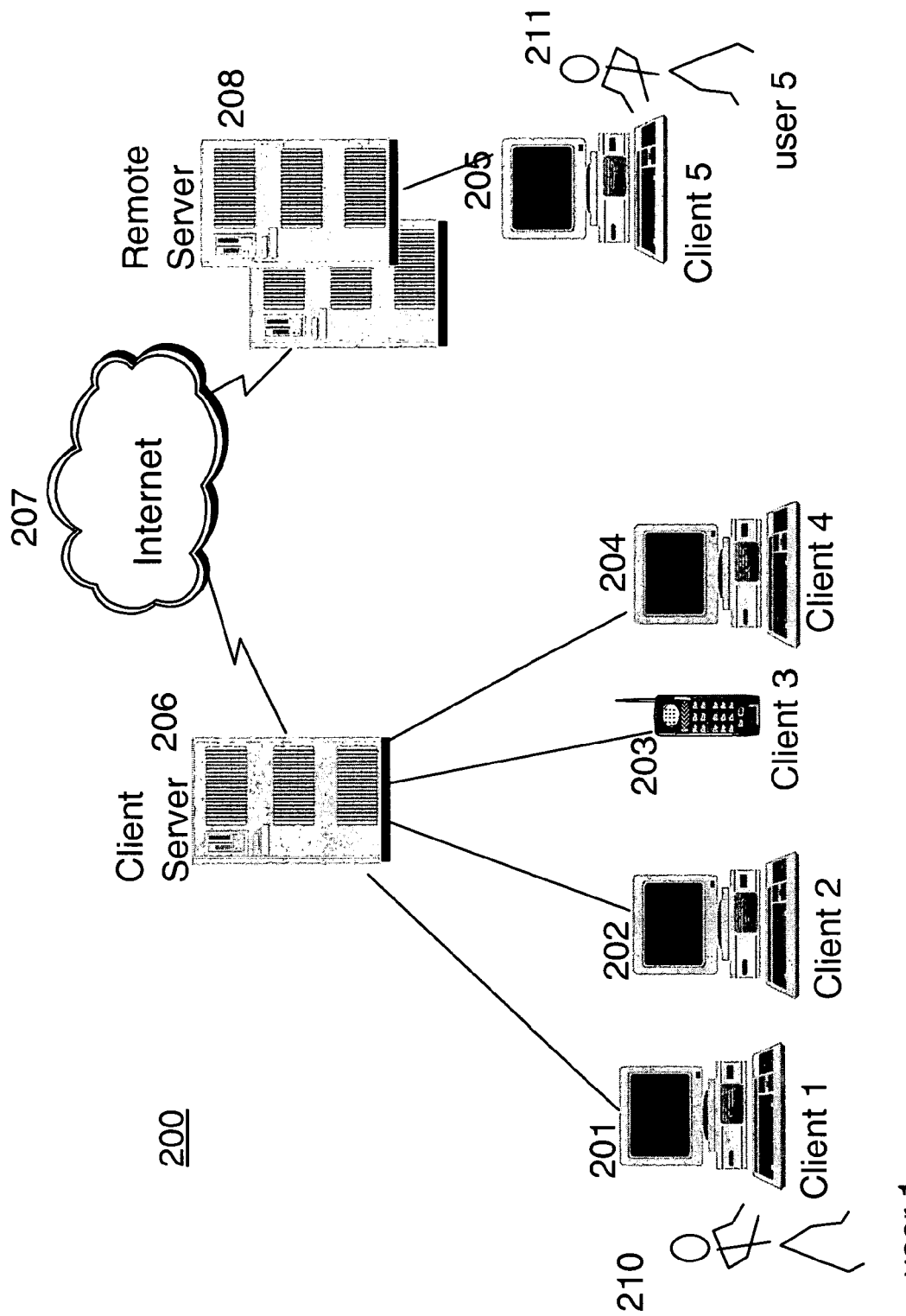
FIG. 2 is a diagram depicting a network of prior art computer systems.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM eServer zSeries® 900 Server available from IBM Corp.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In the following detailed description, of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 3:
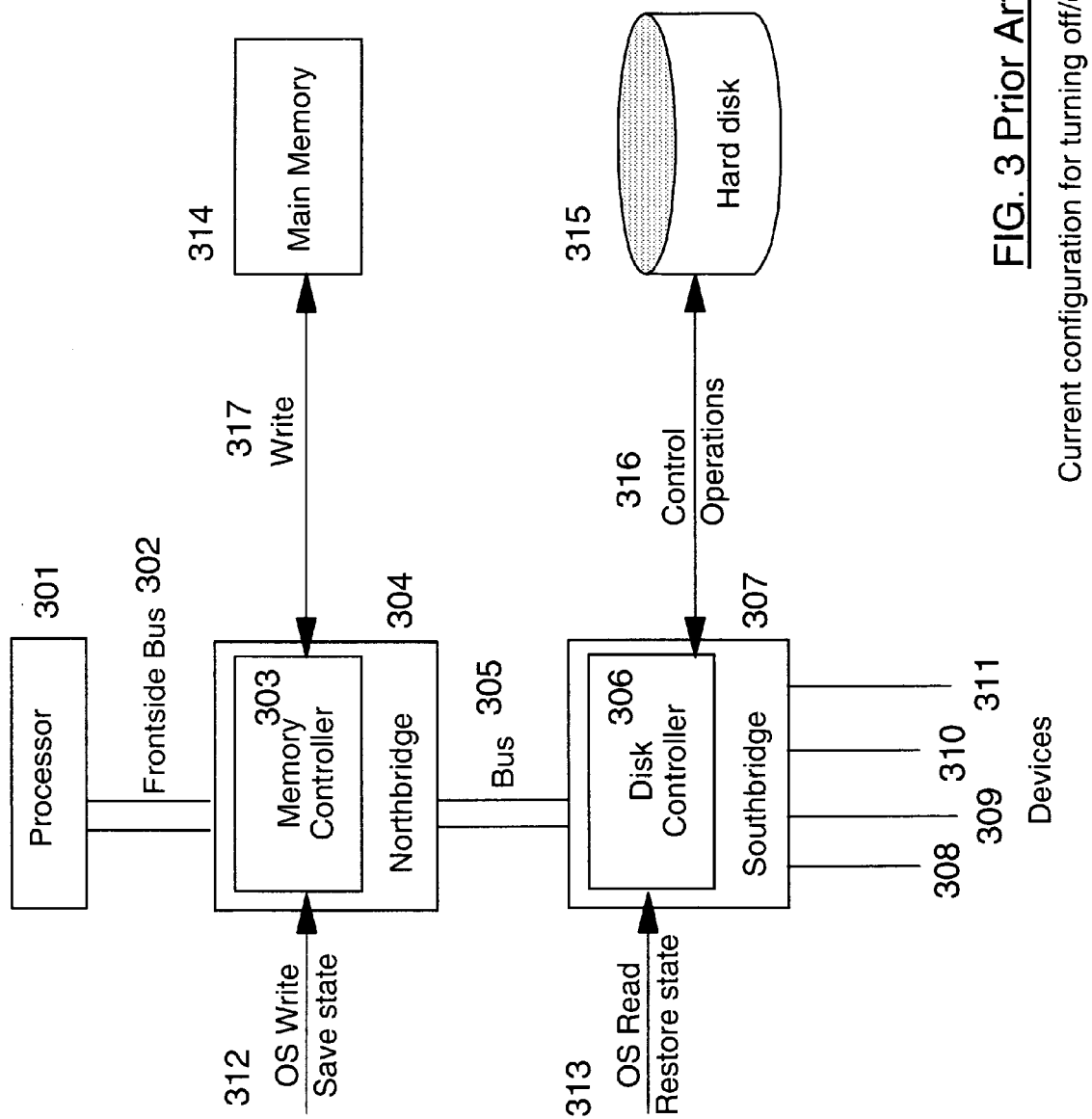
FIG. 3 is a diagram depicting components of a prior art computer hibernation system.

FIG. 3 illustrates a prior art device. The device contains a memory controller 303 that talks to the main memory bank 314 through the read/write channel 317. This device utilizes a hard disk 315 for a persistent storage device. The processor 301 communicates with the hard disk 315 by way of instructions first sent through the frontside bus 302 that are then routed from the Northbridge 304 through the bus 305 to the Southbridge 307 where the disk controller 306 translates them in to control operations 316 that the hard disk 315 uses to read and write data. Additional devices 308, 309, 310, 311 may or may not be attached to the Southbridge 307. During operation of the device, the processor 301 interacts with the memory controller 303 and the disk controller 306, through their respective intermediaries 304 and 307, in order to execute application programs.

Still referring to FIG. 3, when the device enters its hibernation mode prior to powering off, the contents of the main memory bank 314 and state of the processor 302 are stored in the hard disk 315 in a hibernation file that will be read when the device is subsequently powered on.

Figure 4:
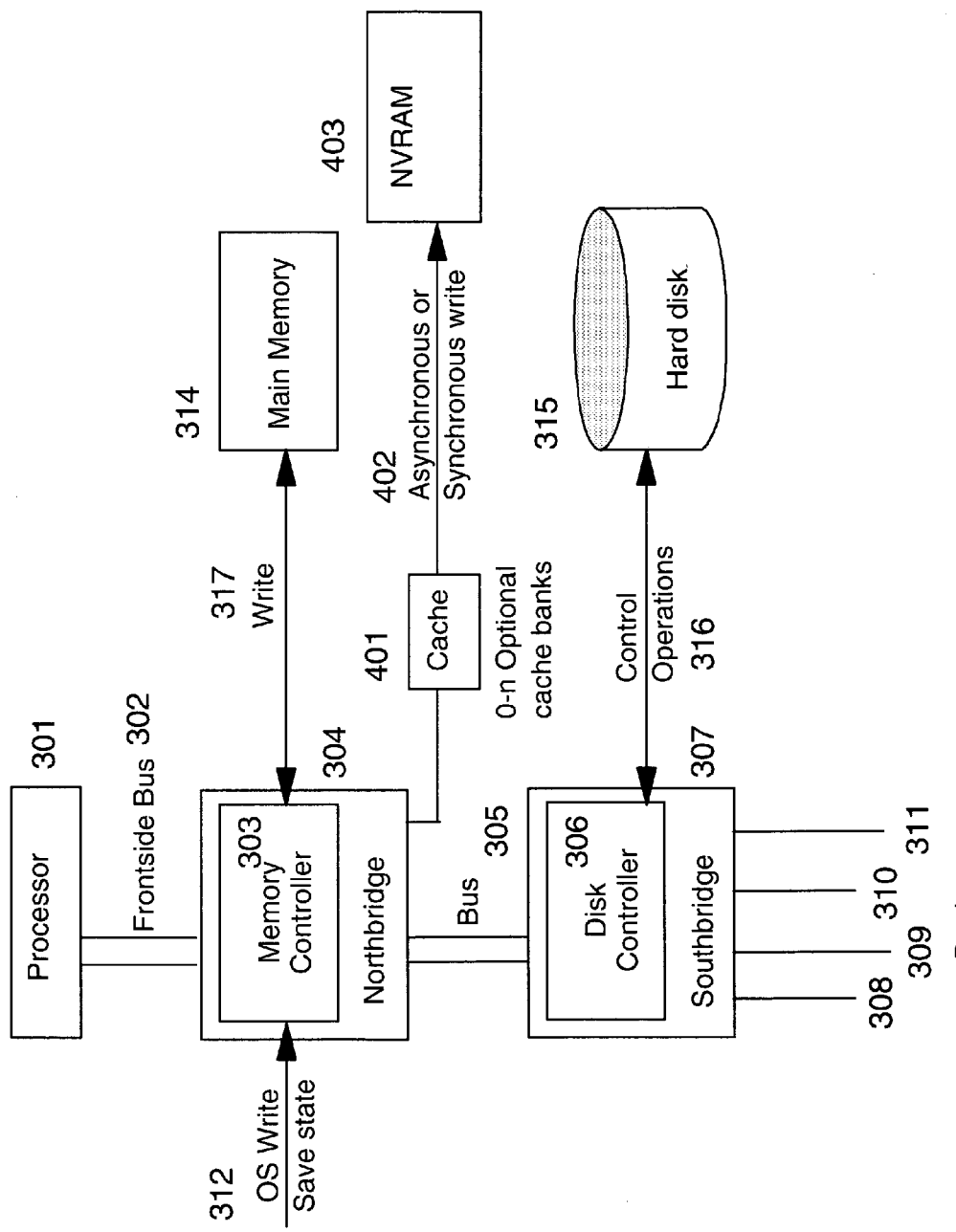
FIG. 4 is a diagram depicting components of this invention in the context of a power off event.

FIG. 4 illustrates a an embodiment of the present invention, which adopts an approach that significantly reduces the power and time requirements necessary to power the device on and off. As the device operates, data is written to the main memory bank 314 in the usual fashion with an additional write operation to a non-volatile memory (NVRAM) bank 403 attached to the device's memory controller 303. Depending on the NVRAM technology used, the write operation may pass through zero or more cache banks 401, or be synchronous or asynchronous 402 or any combination thereof. A consequence of every write to the device's main memory bank 314 is that at any point in time the NVRAM bank 403 contains an exact copy of the data within the main memory bank 314. This consequence is utilized when the device enters its hibernation mode. During the hibernation process the state of the processor 301 is stored inside the NVRAM bank 403 for use when the device resumes operation. Once the state of the processor 301 is stored the device can be powered off completely without loss of data and without the additional time and power requirements necessary to store the state as illustrated by the device in FIG. 3. If cache banks 401 are present, they must be flushed to the NVRAM bank 403 before the device is powered off.

Figure 5:
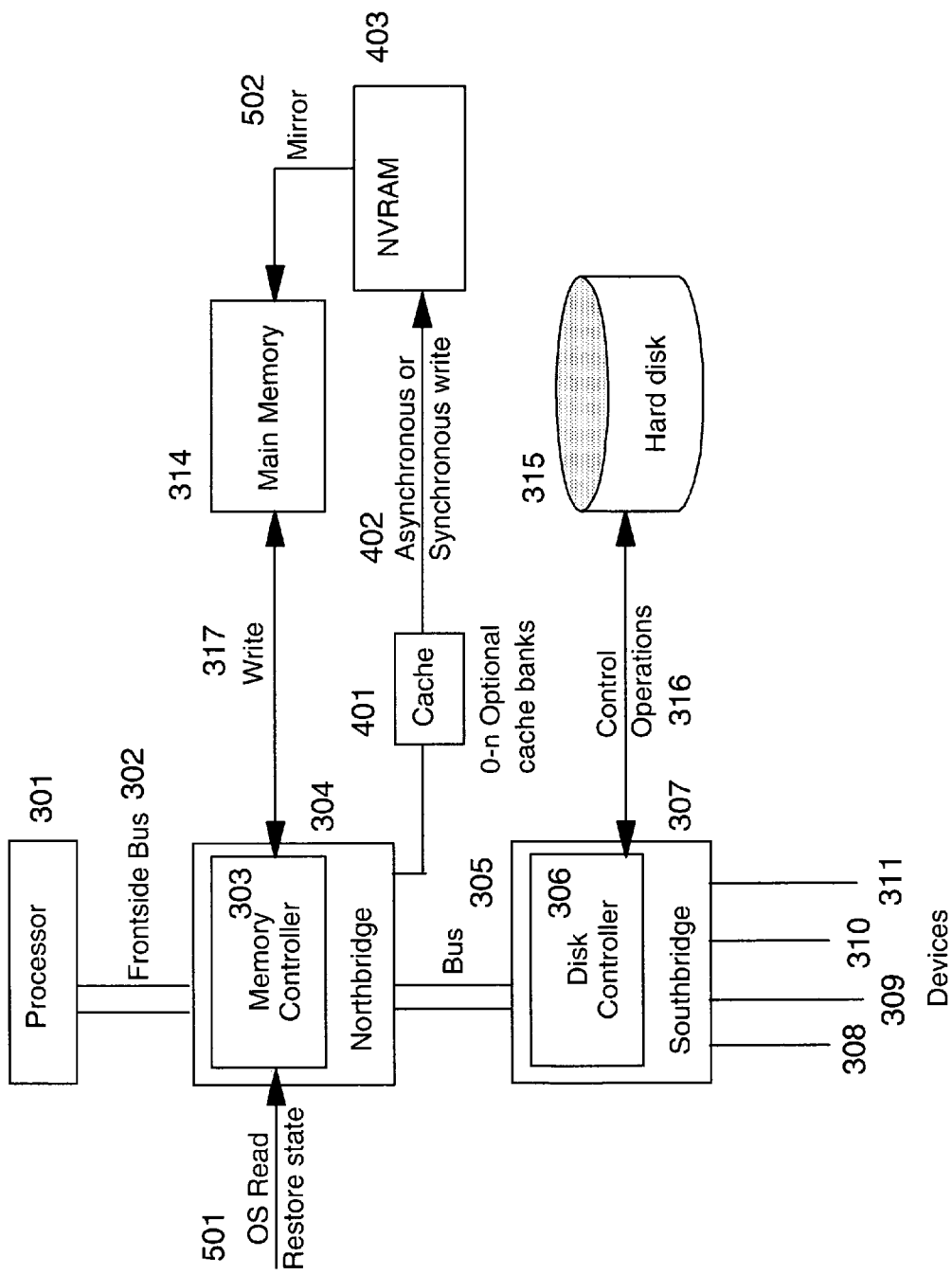
FIG. 5 is a diagram depicting components of this invention in the context of a power on event.

FIG. 5 depicts a similar configuration as that shown in FIG. 4 with an additional operation depicted, i.e. a mirror NVRAM to main memory operation 502. It is important to note that the operation, mirror NVRAM to main memory 502, is a logical operation and does not depict a physical connection between the NVRAM bank 403 and the main memory bank 314. When the device is powered on after hibernating the contents of the NVRAM bank 403 and the saved state of the processor 301 must be restored to their original location. The contents of the NVRAM bank 403 are loaded in to the main memory bank 314 by way of the memory controller 303 directing data be read from the NVRAM bank 403 via the NVRAM read/write channel 402 and then written to the main memory bank 314 via the read/write channel 317. Finally, the state of the processor 301 is restored from the NVRAM bank 403. This entire operation is significantly faster and requires less power than reading the saved state from a hard disk 315 as described in prior art FIG. 3.

Figure 6:
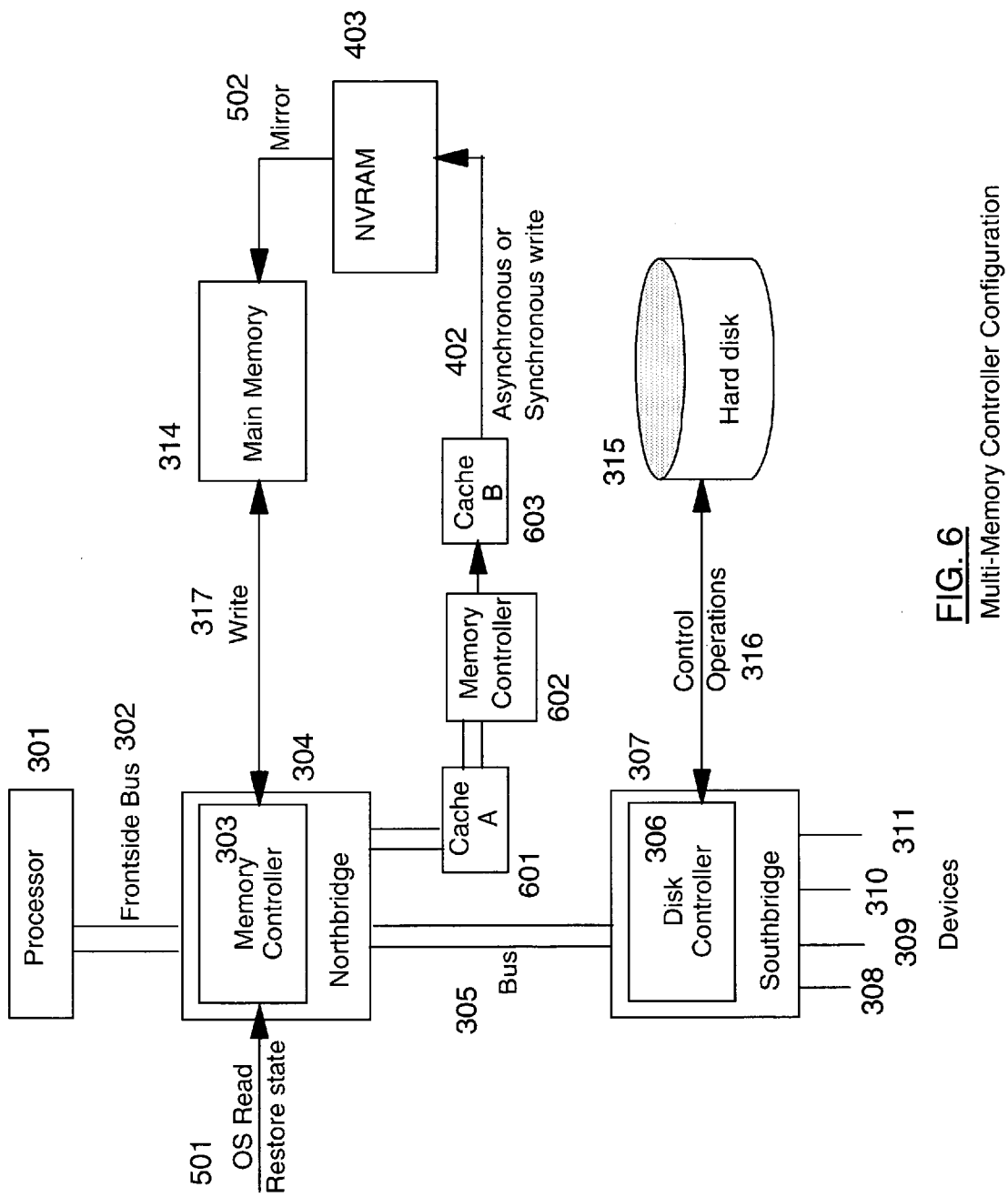
FIG. 6 is a diagram depicting a variation of this invention that uses two memory controllers.

FIG. 6 describes an embodiment that operates in a similar fashion as the one described by FIGS. 4 and 5. The differentiating component is a secondary memory controller 602 directly connected to the primary memory controller 303. The secondary memory controller 602 can be used to eliminate or alleviate the need for the primary memory controller 303 to slow down or wait for the completion of writes to the NVRAM bank 403. As described in FIG. 4, zero or more cache banks may be present between the primary 303 and secondary memory controller 602 and/or the secondary memory controller 602 and NVRAM bank 402 to speed up write operations. The addition of the cache banks stipulates that their contents be flushed to the NVRAM bank 403 prior to the device being powered off. Preferably, only the modified cache lines that have not yet been copied to the NVRAM are flushed in order to improve performance.

Figure 7:
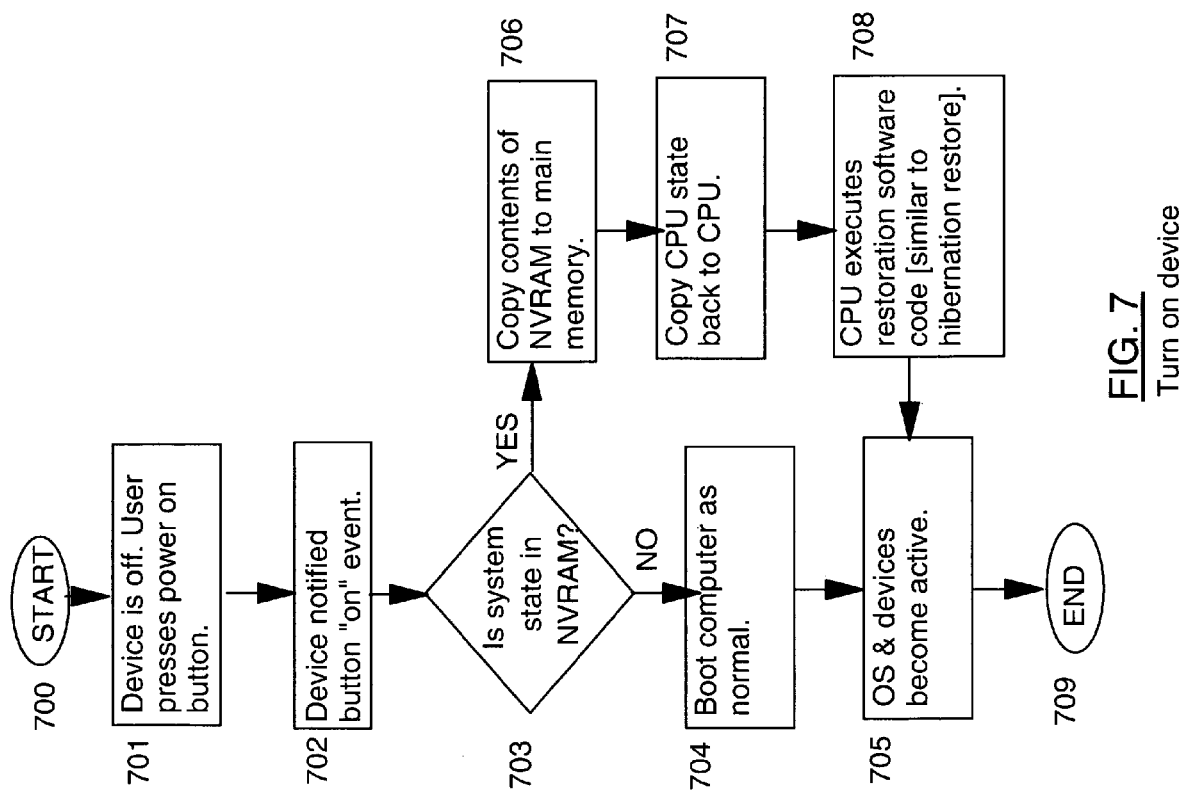
FIG. 7 is a diagram depicting the necessary steps to power on a device that practices this invention.

FIG. 7 illustrates the example steps taken to turn the device on. The START 700 and END 709 steps are convenience items and are not related to a physical component of the device. The user begins by pressing the power on button 701 in order to notify the device 702 that a power "on" event has occurred. The device then determines if the system's state has been stored in NVRAM 703. If NO, then the device is booted as in the prior art 704 and the operating system and devices become available 705 and this process ends 709. If YES, then the contents of the NVRAM bank are copied to main memory 706 and the saved state of the processor is copied back to the processor 707. The device then executes the software code necessary to bring the devices back to their nominal operating state 708 which point the device becomes fully functional 705 and this process ends 709.

Figure 8:
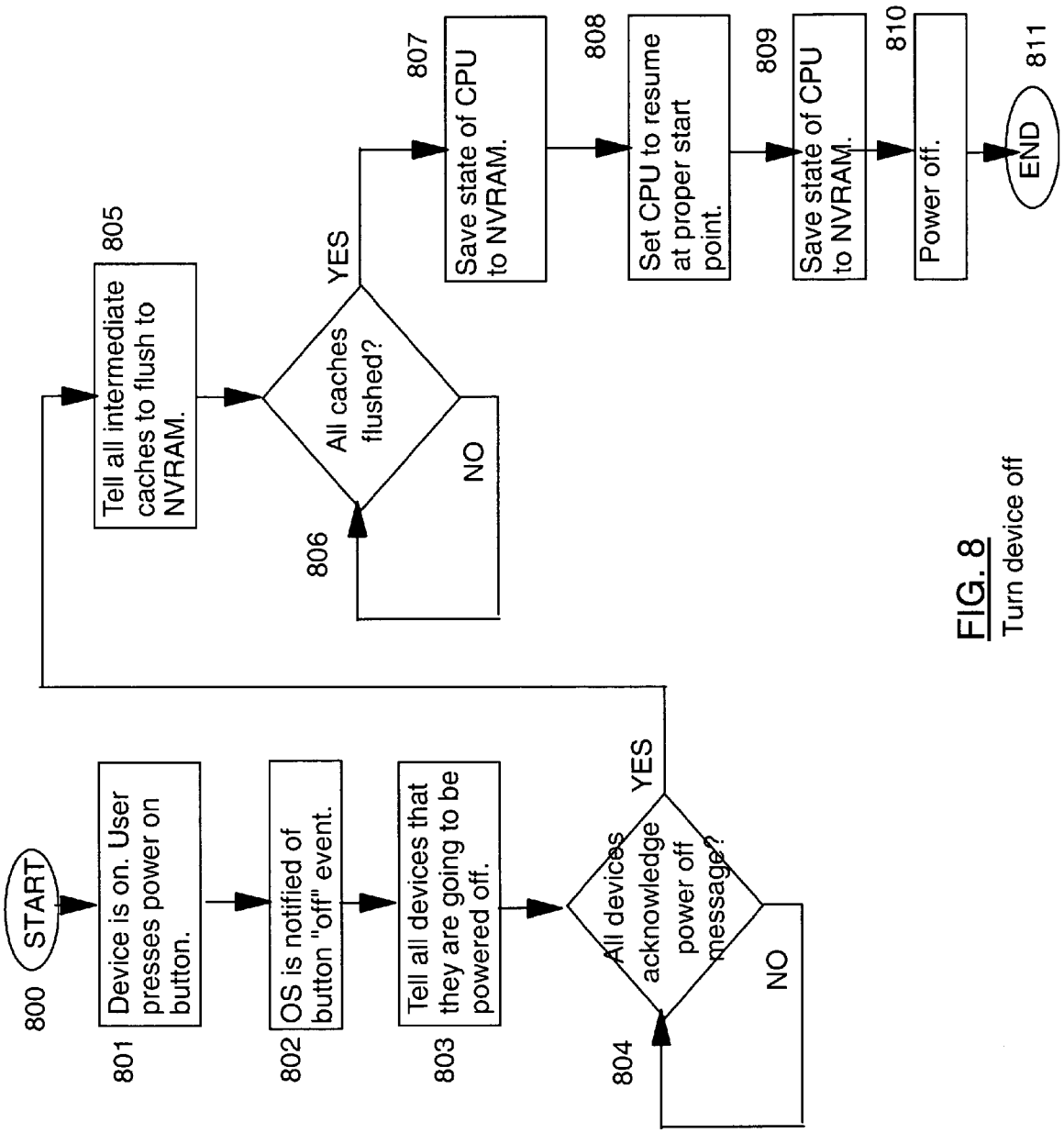
FIG. 8 is a diagram depicting the necessary steps to power off a device that practices this invention.

FIG. 8 illustrates the example steps necessary to turn the device off. The START 800 and END 811 steps are convenience items and are not related to a physical component of the device. The user begins by pressing the power off button 801 which causes the operating system to receive a power "off" event 802. The operating system then informs any additional devices attached to the main device, not including the processor, hard drive, memory controller and their requisite connections to each other, that they are going to be powered off 803. The operating system then tests to see if all devices have acknowledged the power off message 804. If NO, the device continues to wait for acknowledgement of the power off message 804. If YES, the device tells all intermediate caches to flush their data contents to NVRAM 805 (preferably only the modified, not yet stored lines are flushed). The device then tests if all intermediate caches are flushed 806. If NO, the device continues to wait until all intermediate caches are flushed 806. If YES, the state of the processor is stored in NVRAM 807. The processor is then configured to execute the proper restore code 808 and its resulting state is stored in NVRAM 809. The device the powers off 810 and the process ends 811.

Figure 9:
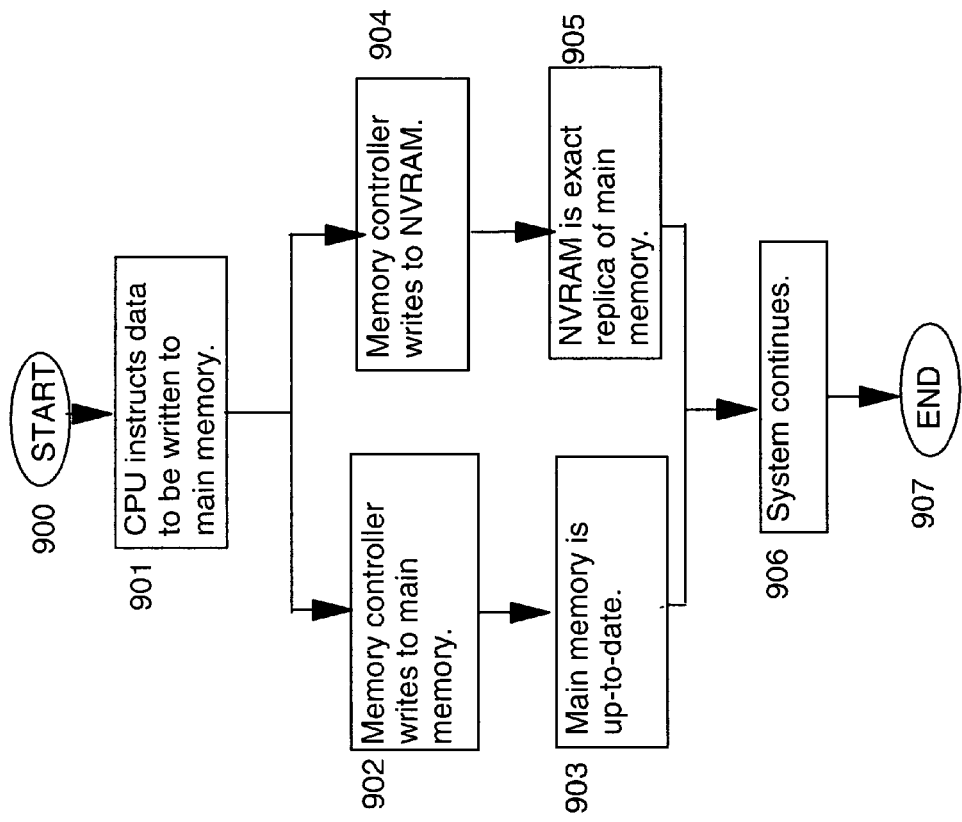
FIG. 9 is a diagram depicting the necessary steps to write data to main memory in a device that practices this invention.

FIG. 9 illustrates the example steps taken to write data to main memory and NVRAM. The START 900 and END 907 steps are convenience items and are not related to a physical component of the device. The write operation begins when the processor instructs that data is to be written to main memory 901. Then, in a parallel fashion, the memory controller writes data to main memory 902 and to NVRAM 904 which results in an up-to-date copy of the main memory 903 and an exact replica stored in NVRAM 905. The system then continues its normal operation 906 and this process ends 907.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A computer system for facilitating startup/shutdown of the computer system, the computer system comprising:
   a volatile system memory;
   a non-volatile mirror store;
   a memory controller; and
   a processor in communications with the volatile system memory by way of the memory controller, the system capable of performing a method comprising:
   prior to normal operation of the computer system, a computer system startup process copying contents of a non-volatile mirror store into the volatile system memory such that content of both the non-volatile mirror store and volatile system memory are identical, the content comprising state information saved during a previous computer system shutdown event;
   responsive to the computer system being in normal operation, performing steps a) and b);
   a) the processor manipulating data in volatile system memory by way of said memory controller; and
   b) responsive to the processor storing data in volatile system memory by way of the memory controller, the memory controller storing the data to both said volatile system memory and said non-volatile mirror store, such that content of the mirror store is maintained to be identical to content of the volatile system memory during normal operation; and
   responsive to the computer system leaving normal operation in order to shutdown the computer system, saving state information in said non-volatile mirror store.

2. The computer system according to claim 1, wherein the non-volatile mirror store comprises Non-Volatile Random Access Memory (NVRAM), further comprising:
   responsive to receiving a startup signal to start the computer system, beginning the startup process;
   responsive to the startup process having copied the non-volatile mirror store into the volatile system memory, beginning normal operation of the computer system, said beginning normal operation comprising making programs of the computer system operational, the programs comprising an operating system and zero or more application programs;

responsive to receiving a shutdown signal to shutdown the computer system, causing the computer system to leave normal operation in order to shutdown the computer system, the leaving normal operation comprising making programs of the computer system non-operational; and responsive to state information being saved to said non-volatile mirror store after leaving normal operation, turning off power to the computer system.

3. The computer system according to claim 1, wherein leaving normal operation comprises entering a hibernation mode.

4. The computer system according to claim 1, wherein the volatile system memory is the same size as the non-volatile mirror store.

5. The computer system according to claim 1, wherein the memory controller further comprises an optional cache memory, step b) further comprises:

the memory controller storing said data to said volatile system memory and said optional cache memory; and subsequently storing the data from said optional cache memory to said non-volatile mirror store.

6. The computer system according to claim 2, wherein the startup signal to startup the computer system is derived from a powering on event of the computer system.

7. The computer system according to claim 2, wherein responsive to the computer system being in normal operation, fetching data only from volatile system memory and not from non-volatile mirror store.

8. The computer system according to claim 1, further comprising:

paging data from external store to volatile system memory; and responsive to said paging data, the memory controller storing the data to both said volatile system memory and said non-volatile mirror store, such that content of the mirror store is maintained to be identical to content of the volatile system memory during normal operation.

9. The computer system according to claim 1, wherein the computer system is a mobile device.

10. A computer program product for facilitating startup/shutdown of a computer system, the computer program product comprising:

a storage medium readable by a processing circuit of a computer system, the computer system comprising a processor in communications with a volatile system memory by way of a memory controller, the storage medium storing instructions for execution by the processing circuit for performing a method comprising:

prior to normal operation of the computer system, a computer system startup process copying contents of a non-volatile mirror store into the volatile system memory such that content of both the non-volatile mirror store and volatile system memory are identical, the content comprising state information saved during a previous computer system shutdown event;

responsive to the computer system being in normal operation, performing steps a) and b);

a) the processor manipulating data in volatile system memory by way of said memory controller; and b) responsive to the processor storing data in volatile system memory by way of the memory controller, the memory controller storing the data to both said volatile system memory and said non-volatile mirror store, such that content of the mirror store is maintained to be identical to content of the volatile system memory during normal operation; and responsive to the computer system leaving normal operation in order to shutdown the computer system, saving state information in said non-volatile mirror store.

11. The computer program product according to claim 10, further comprising:

responsive to receiving a startup signal to start the computer system, beginning the startup process;

responsive to the startup process having copied the non-volatile mirror store into the volatile system memory, beginning normal operation of the computer system, said beginning normal operation comprising making programs of the computer system operational, the programs comprising an operating system and zero or more application programs;

responsive to receiving a shutdown signal to shutdown the computer system, causing the computer system to leave normal operation in order to shutdown the computer system, the leaving normal operation comprising making programs of the computer system non-operational; and responsive to state information being saved to said non-volatile mirror store after leaving normal operation, turning off power to the computer system.

12. The computer program product according to claim 10, wherein the memory controller further comprises an optional cache memory, step b) further comprises:

the memory controller storing said data to said volatile system memory and said optional cache memory; and subsequently storing the data from said optional cache memory to said non-volatile mirror store.

13. The computer program product according to claim 11, wherein responsive to the computer system being in normal operation, fetching data only from volatile system memory and not from non-volatile mirror store.

14. The computer program product according to claim 10, wherein the volatile system memory is the same size as the non-volatile mirror store.

15. The computer program product according to claim 10, further comprising:

paging data from external store to volatile system memory; and responsive to said paging data, the memory controller storing the data to both said volatile system memory and said non-volatile mirror store, such that content of the mirror store is maintained to be identical to content of the volatile system memory during normal operation.

* * * * *